(12) United States Patent
Moisel

(10) Patent No.: US 6,236,788 B1
(45) Date of Patent: May 22, 2001

(54) ARRANGEMENT FOR ALIGNING OPTICAL COMPONENTS

(75) Inventor: Jörg Moisel, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/409,879

(22) Filed: Oct. 1, 1999

(30) Foreign Application Priority Data

Oct. 1, 1998 (DE) .............................................. 198 45 227

(51) Int. Cl.⁷ ...................................................... G02B 6/26
(52) U.S. Cl. .................................. 385/52; 385/14; 385/31
(58) Field of Search .......................... 385/14, 15, 31–36, 385/39, 42, 47, 52, 53

(56) References Cited

U.S. PATENT DOCUMENTS

| | | |
|---|---|---|
| 4,268,123 | 5/1981 | Mesco . |
| 5,416,870 * | 5/1995 | Chun et al. ............................. 385/88 |
| 5,446,814 * | 8/1995 | Kuo et al. ............................... 385/31 |
| 5,479,540 * | 12/1995 | Boudreau et al. ...................... 385/14 |
| 5,600,741 * | 2/1997 | Hauer et al. ............................ 385/35 |
| 5,748,827 | 5/1998 | Holl et al. . |
| 6,095,697 * | 8/2000 | Lehman et al. ........................ 385/88 |
| 6,115,521 * | 9/2000 | Tran et al. ............................... 385/52 |

FOREIGN PATENT DOCUMENTS

| | | |
|---|---|---|
| 43 13 493 | 5/1994 | (DE) . |
| 2 315 595 | 2/1998 | (GB) . |

\* cited by examiner

*Primary Examiner*—Akm E. Ullah
*Assistant Examiner*—Michelle R. Connelly-Cushwa
(74) *Attorney, Agent, or Firm*—Venable; Robert Kinberg

(57) ABSTRACT

An arrangement for coupling light into or coupling light out of waveguides includes a base plate with thereon attached mirror mount and reflecting surface, at least one waveguide, as well as a holding device for holding optical or optoelectronic components. The mirror mount and the holding device contain alignment marks, which snap together so that an alignment occurs in a direction (x-direction) that is parallel to the longitudinal extension of the waveguide. The holding device and the base plate contain further alignment marks, which ensure an alignment in a direction (y-direction) that is perpendicular to the longitudinal extension of the waveguide.

6 Claims, 2 Drawing Sheets

X

ARRANGEMENT FOR ALIGNING OPTICAL COMPONENTS

CROSS-REFERENCE TO RELATED APPLICATIONS

Priority is claimed with respect to German application No. 198 452 27.6 filed in Germany on Oct. 1, 1998, the disclosure of which is incorporated herein by reference.

BACKGROUND OF THE INVENTION

The invention relates to an arrangement for coupling light into and coupling light out of a waveguide, comprising a base plate with thereon attached mirror mount and reflecting surface, at least one waveguide, and a holding device for holding optical or optoelectronic components.

The technology of establishing optical links, optical communication lines and for connecting optical systems requires the alignment of individual components relative to each other. In the process, the thermal expansion of materials with varied heat expansion rates must be taken into account. One option of carrying out a precise alignment is referred to in expert circles by the term "kinematic mount."

U.S. Pat. No. 5,748,827 discloses such an arrangement with two-stage alignment, where the position of several optical components relative to each other is determined first through a rough alignment and subsequently through a precise alignment. In the process, 6 translational degrees–3 of translation and 3 of rotation—are detected. A positioning accuracy in the sub-millimeter range in all directions is necessary during the rough alignment when the individual components are assembled, so as to allow the snapping together of the alignment marks. A positioning accuracy of several micrometers is achieved only with the arrangement for the precise alignment.

Another arrangement for alignment is described in U.S. Pat. No. 4,268,123. This arrangement permits the mounting of optical components with little stress. An interlocking of ring-shaped elements is intended to avoid the transfer of stress from the housing to the optical components.

These comparably expensive techniques are necessary because all required alignment marks are provided on one carrier and the other components are positioned with great accuracy at the intended location or multi-stage methods must be used for a rough alignment and a precise alignment.

SUMMARY OF THE INVENTION

It is an object of the invention to provide an arrangement, which permits a simple and extremely precise alignment of optical components relative to each other.

The above and other objects are accomplished according to the invention by the provision of an arrangement for coupling light into or coupling light out of waveguides which comprises a base plate with a thereon attached mirror mount and a reflecting surface, at least one waveguide, and a holding device for holding optical or optoelectronic components. The mirror mount and the holding device contain alignment marks, which snap together so that an alignment occurs initially in a direction parallel to the longitudinal extension of the waveguide (x-direction). The holding device and the base plate contain further alignment marks, which ensure an alignment in a direction perpendicular to the longitudinal extension of the waveguide (y-direction), independent of the previously determined x-direction.

In this case, optical or optoelectronic components are preferably fitted into a recess opening of the holding device.

Lenses, luminous diodes or laser diodes, photo diodes, glass fiber connectors are used as optical or optoelectronic components. Different materials can be used for the base plate and for all other parts, which materials are preferably composed of semiconductor material or ceramic material or plastic materials for printed circuit boards.

The first alignment marks are formed in the mirror mount as wedge-shaped indentation or groove and the second alignment marks are formed as wedges and or pegs, elongated if necessary, which project from the underside of the holding device. The fourth alignment marks project from the underside of the holding device as hemispheres, wedges or conical pegs.

One particular advantage of the invention is that the required positioning accuracy is ensured over several processing steps. Since the necessary alignment marks for the respective alignment in x or y direction are located on different carriers, the respective position in one direction is determined simply by snapping together two alignment marks. For example, the alignment in x-direction occurs with the aid of a notching in the mirror mount, wherein the initially not defined y-direction does not affect the alignment accuracy owing to the lateral expansion of the mirror. The alignment in y-direction is separate and occurs, for example, through a precise arrangement of a waveguide relative to the optical component in the holding device, which still allows a displacement along the reflecting surface without loss of quality.

On the whole, an accuracy of a few millimeters in both alignment steps is sufficient to precisely position the holding device for the optical components with an accuracy of a few micrometers above the waveguide.

An additional advantage of the arrangement can be seen in that the alignment in x- and y-direction is passive, can be achieved through a snapping together, and it is not necessary to move the parts to the correct location under the microscope.

BRIEF DESCRIPTION OF THE DRAWINGS

The invention is explained in the following in further detail with the aid of exemplary embodiments and by taking into account schematic drawings in the figures, which show in.

DETAILED DESCRIPTION OF THE INVENTION

Figure 1:
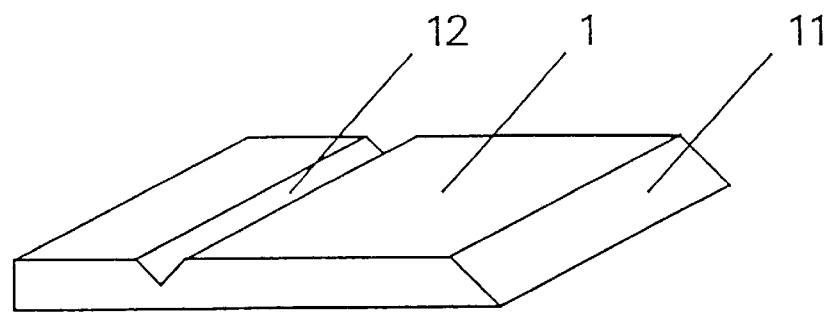
FIG. 1: a perspective view of the mirror mount with a first alignment mark.
Figure 2:
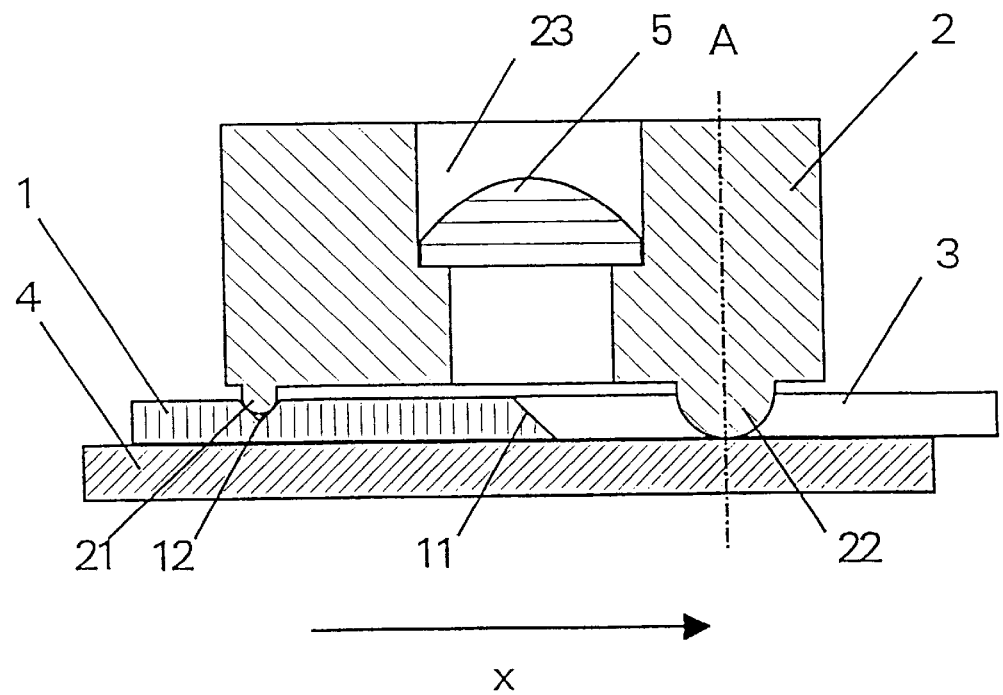
FIG. 2: a section through the arrangement, parallel to the longitudinal axis of the waveguide (view from the side)
Figure 3:
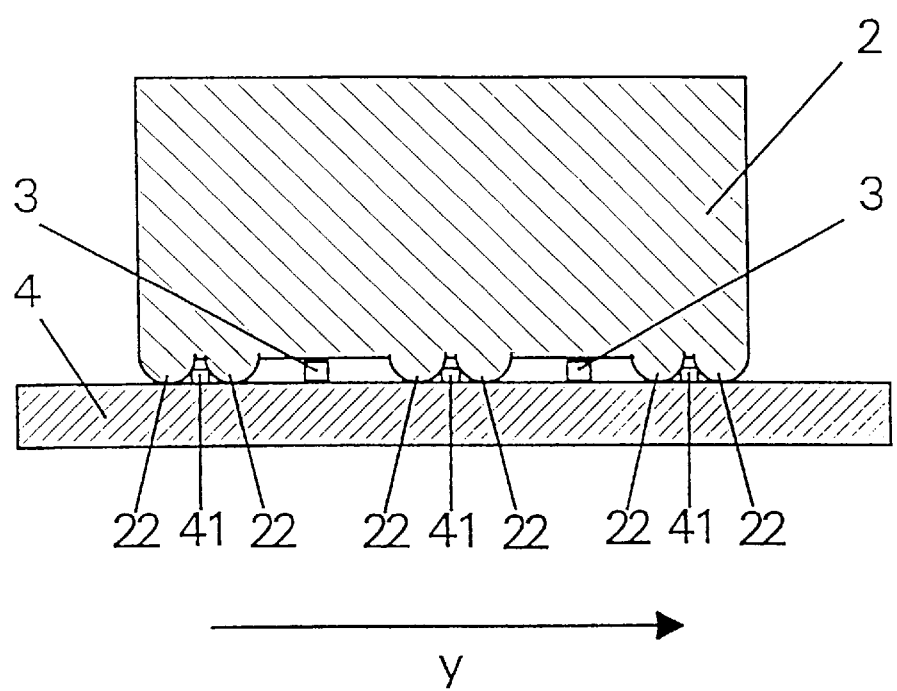
FIG. 3: a section through the arrangement, perpendicular to the longitudinal axis of the waveguide along the line A shown in FIG. 2 (view from the front).

A mirror mount 1 for a first exemplary embodiment according to FIG. 1 is shown with a reflecting surface 11 that is beveled along the side wall. The first alignment mark 12 for an alignment in x-direction is a wedge-shaped groove in the surface. According to FIG. 2, the mirror mount 1 is positioned on a base plate 4. The second alignment mark 21 on the underside of holding device 2 snaps into the groove of the first alignment mark 12 and thus aligns the reflecting surface 11 with respect to the optical component 5 that is fitted into the holding device 2. A lateral displacement along the groove simply causes a parallel displacement along the extended reflecting surface 11, which is not critical for an alignment in x-direction. The optical component 5 in this case was selected to be a lens, which is held in place precisely inside a recess 23. The waveguide 3 is extended to the reflecting surface 11 and, if necessary, can be connected at the contact surface by means of a medium for which the refractive index is adjusted to the waveguide. The marks 22 and 41, shown in FIG. 3, are used for the alignment. FIG. 3 shows a section along the line A of FIG. 2, which extends perpendicular to the drawing plane. For the alignment in y-direction, the third alignment marks 22 and the fourth alignment marks 41 snap together in such a way that the waveguide 3 is positioned precisely. The waveguide 3 normally is produced together with the fourth alignment marks 41 in one processing step. As a result, both are at an exactly defined distance to each other. Consequently, the position of the individual components relative to each other is exactly defined in x-direction as well as y-direction. For the alignment marks, wedge-shaped indentations or grooves in connection with wedges or pegs are preferably selected as geometries, so that the components to be assembled can be snapped together.

What is claimed is:

1. An arrangement for coupling light into and coupling light out of a waveguide, comprising:

a base plate;

a mirror mount and reflecting surface positioned to the base plate; and at least one waveguide and a holding device for holding optical or optoelectronic components mounted on the base plate;

wherein the mirror mount includes with first alignment marks and the holding device includes second alignment marks which snap together with the first alignment marks to permit an alignment in a direction (x-direction) that is parallel to the waveguide; and the holding device includes third alignment marks and the base plate includes fourth alignment marks which are used for an alignment in a direction (y-direction) that is perpendicular to the waveguide.

2. An arrangement according to claim 1, wherein the holding device has a recess opening into which optical or optoelectronic components are fitted.

3. An arrangement according to claim 1, wherein the optical or optoelectronic components comprise one of lenses, luminous diodes, laser diodes, photo diodes and glass fiber connectors.

4. An arrangement according to claim 1, wherein the base plate comprises one of a semiconductor material, a ceramic material and a printed circuit board.

5. An arrangement according to claim 1, wherein the first alignment marks are formed in the mirror mount as a wedge-shaped indentation or groove and the second alignment marks are formed as wedges or peg and project from an underside of the holding device.

6. An arrangement according to claim 1, wherein the third and fourth alignment marks comprise one of hemispheres, wedges and conical pegs which project from an underside of the holding device and a top of the base plate.

* * * * *